United States Patent
Bates et al.

(10) Patent No.: US 7,251,494 B2
(45) Date of Patent: *Jul. 31, 2007

(54) TELEPHONE SYSTEM AND METHOD FOR SELECTIVELY RINGING A PORTABLE PHONE BASED ON THE SELF-DETECTED GEOGRAPHICAL POSITION OF THE PORTABLE PHONE

(75) Inventors: Cary Lee Bates, Rochester, MN (US); Jeffrey Michael Ryan, Byron, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/196,877

(22) Filed: Aug. 4, 2005

(65) Prior Publication Data

US 2006/0079243 A1   Apr. 13, 2006

Related U.S. Application Data

(63) Continuation of application No. 09/591,331, filed on Jun. 9, 2000, now Pat. No. 6,975,874.

(51) Int. Cl.
*H04Q 7/20* (2006.01)

(52) U.S. Cl. ............... 455/456.6; 455/456.3; 455/412.2

(58) Field of Classification Search ............ 455/414.1, 455/414.2, 417, 421, 445, 456.1, 456.5, 458, 455/456.6, 422.1, 404.1, 404.2; 379/210, 379/211, 212.01, 204.01, 216.01

See application file for complete search history.

(56) References Cited

U.S. PATENT DOCUMENTS 5,222,123 A    6/1993   Brown et al.

(Continued)

FOREIGN PATENT DOCUMENTS

EP    0865188 A2    9/1998

(Continued)

OTHER PUBLICATIONS

Anonymous: "Mobile Telephone with Position Reporting System", Research Disclosure, Kenneth Mason.

(Continued)

*Primary Examiner*—Jean Gelin
(74) *Attorney, Agent, or Firm*—Martin & Associates, LLC; Derek P. Martin

(57) ABSTRACT

A portable phone is equipped with a position detector that detects the geographical position of the portable phone, and the function of the phone can be changed according to its geographical position. One or more "regions" may be defined by the user of the portable phone, and the ring parameters for each region may be set independently of the other regions. In this manner a phone in accordance with the preferred embodiments may ring with one tone at home, ring with a different tone at work, ring with a louder volume when on a job site, not ring at all when in church, and ring with a vibration when at the theater. The preferred embodiments further allow assigning a telephone number to a defined geographical region, and ringing the portable phone only when within the geographical region that corresponds to the phone number.

4 Claims, 9 Drawing Sheets

U.S. PATENT DOCUMENTS

| | | | |
|---|---|---|---|
| 5,235,633 A | 8/1993 | Dennison et al. | |
| 5,502,762 A | 3/1996 | Andrew et al. | |
| 5,515,426 A * | 5/1996 | Yacenda et al. | 379/201.07 |
| 5,711,007 A * | 1/1998 | Lin et al. | 455/447 |
| 5,745,850 A | 4/1998 | Aldermeshian et al. | |
| 5,757,902 A | 5/1998 | Mitsuo | |
| 5,778,304 A | 7/1998 | Grube et al. | |
| 5,802,466 A * | 9/1998 | Gallant et al. | 455/413 |
| 5,845,207 A | 12/1998 | Amin et al. | |
| 5,903,833 A | 5/1999 | Jonsson et al. | |
| 6,038,451 A * | 3/2000 | Syed et al. | 455/445 |
| 6,141,556 A | 10/2000 | Dougherty et al. | |
| 6,163,597 A * | 12/2000 | Voit | 379/93.17 |
| 6,195,558 B1 | 2/2001 | Griffith et al. | |
| 6,253,088 B1 * | 6/2001 | Wenk et al. | 455/462 |
| 6,327,349 B1 * | 12/2001 | Rollins | 379/114.27 |
| 6,381,470 B1 * | 4/2002 | Griffith et al. | 455/551 |
| 6,405,041 B1 | 6/2002 | Mukerjee et al. | |
| 6,459,695 B1 * | 10/2002 | Schmitt | 370/344 |
| 6,643,517 B1 * | 11/2003 | Steer | 455/456.4 |
| 6,914,896 B1 * | 7/2005 | Tomalewicz | 370/352 |

FOREIGN PATENT DOCUMENTS

| | | |
|---|---|---|
| EP | 0876070 A1 | 11/1998 |
| EP | 0876071 A1 | 11/1998 |
| JP | 08-186647 | 7/1996 |
| JP | 09-191494 | 7/1997 |
| JP | 09-247749 | 9/1997 |
| JP | 11018159 | 1/1999 |
| JP | 11-331948 | 11/1999 |
| WO | WO9933199 | 7/1999 |

OTHER PUBLICATIONS

Publications, Hampshire, GB, vol. 41, No. 410, Jun. 1, 1998, XP002170406.

* cited by examiner

| Region | Ring Parameters |
|---|---|
| Home | Audible Ring, Tone A, Normal Volume |
| Office | Audible Ring, Tone B, Normal Volume |
| Church | No Ring |
| Job Site | Audible Ring, Tone B, High Volume |
| Theater | Vibration Ring |

TELEPHONE SYSTEM AND METHOD FOR SELECTIVELY RINGING A PORTABLE PHONE BASED ON THE SELF-DETECTED GEOGRAPHICAL POSITION OF THE PORTABLE PHONE

REFERENCE TO PARENT APPLICATION

This patent application is a continuation of the patent application "PORTABLE PHONE THAT CHANGES FUNCTION ACCORDING TO ITS SELF-DETECTED GEOGRAPHICAL POSITION", Ser. No. 09/591,331 filed by Bates et al. on Jun. 9, 2000 now U.S. Pat. No. 6,975,874, which is incorporated herein by reference.

BACKGROUND OF THE INVENTION

1. Technical Field

This invention generally relates to telephone systems and more specifically relates to portable phones.

2. Background Art

Since Alexander Graham Bell uttered those famous words "Mr. Watson—come here—I want to see you", the telephone has evolved into a necessity of modem living. Land-based telephone systems are the most ubiquitous, and have been found in most homes and businesses in the United States for many decades. Recently, wireless phones have gained in popularity. Wireless phones include cellular phones, digital phones, satellite phones, etc. For the purpose of discussion herein, the term "portable phone" applies to any and all types of wireless phones, whether now known or developed in the future.

It would be useful for a user to define different "regions" and to have their phone function differently according to which region the phone is in. For example, it would be useful to have the phone ring with one tone when the user is home, and with a different tone when the user is at work. However, modem portable phones do not have any way of changing function based on the geographical position of the phone. Without a way for a portable phone to change its function based on its geographical position, portable phones will have limitations that will continue to annoy users.

DISCLOSURE OF INVENTION

According to the preferred embodiments, a portable phone is equipped with a position detector that detects the geographical position of the portable phone, and the function of the phone can be changed according to its geographical position. One or more "regions" may be defined by the user of the portable phone, and the ring parameters for each region may be set independently of the other regions. In this manner a phone in accordance with the preferred embodiments may ring with one tone at home, ring with a different tone at work, ring with a louder volume when on a job site, not ring at all when in church, and ring with a vibration when at the theater. In addition, the preferred embodiments include a dialer that allows selecting a contact from a text list, and that dials a number that depends on the geographical position of the portable phone, or that dials a number and sends with the call the geographical position of the portable phone. The preferred embodiments further allow assigning a telephone number to a defined geographical region, and ringing the portable phone only when within the geographical region that corresponds to the phone number.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
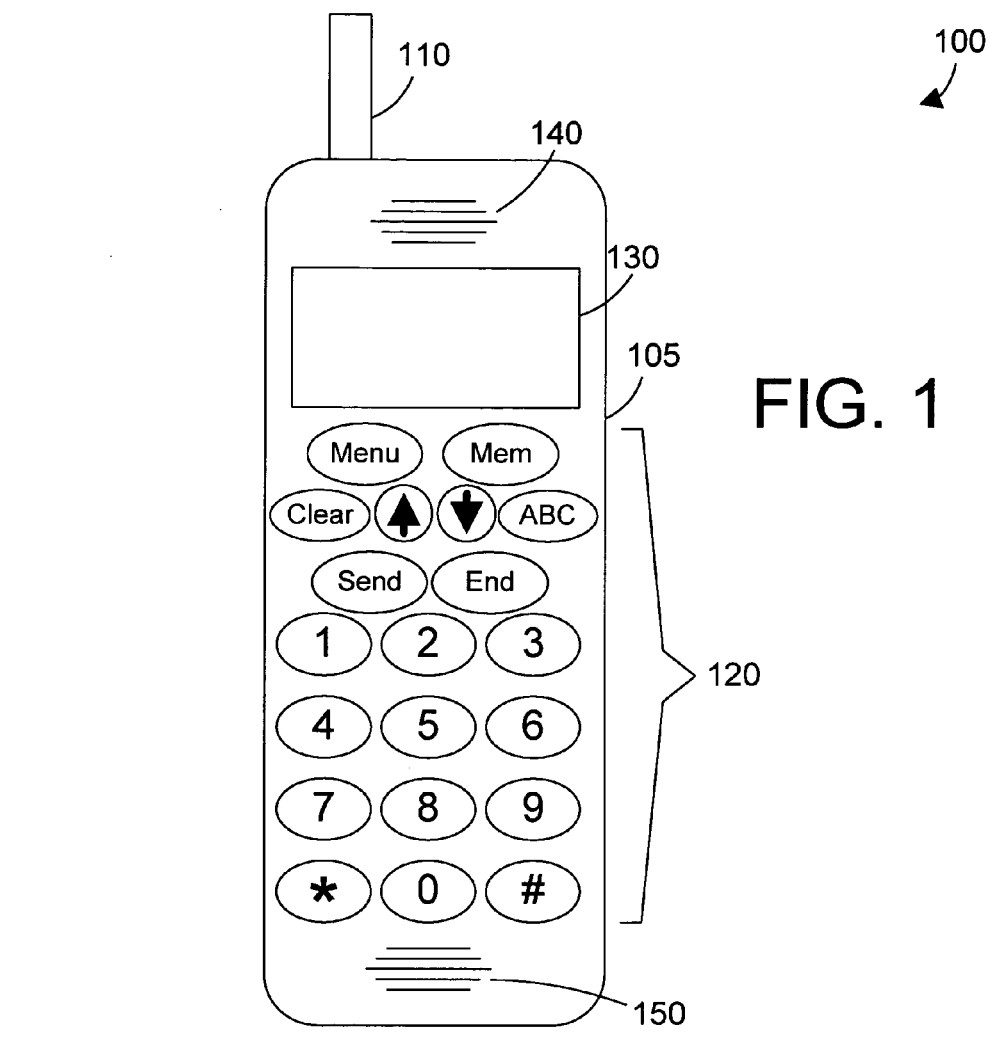
FIG. 1 is a diagram of a portable phone in accordance with the preferred embodiments.

Throughout history, the telephone has been an important device for communicating the need for emergency services. The phrase "Operator, get me the police!" has been used in many Hollywood movies. Land-based telephone systems have evolved to include emergency systems known as "911" systems that catalog the location of each telephone along with its telephone number. Modem land-based telephone systems communicate an identifier when placing a call, often referred to as a "caller ID". When a person calls 911 from a land-based phone, the 911 computer system automatically detects the caller ID, and displays the caller's location from its database. This allows emergency vehicles to be dispatched even if the caller is unable to speak or identify his or her location.

Retrieving the location of a land-based phone when a person calls 911 is a simple task because the location of the phone does not change over time. However, with portable phones, there is currently no "911" equivalent system that allows emergency vehicles to be dispatched to the portable phone's location, because the location constantly changes. In one case in South Dakota, a woman ran her car into a ditch during a blizzard. She called the police on her cellular phone and said she had no idea where she was located. Over the next several hours, she called in several times for a few minutes at a time (to preserve her phone's battery life) while emergency services personnel worked with the cell phone company to locate the woman's phone based on a well-known technique known as "triangulation" of her cell phone signal. After several hours, her location was identified with enough certainty to allow emergency workers to find her. While this outcome was a happy one, it is clear that many people who have emergencies do not have hours to wait for help to arrive. This case illustrates the need for a 911-type of system for portable phones. If a person is having a heart attack, that person may well be dead in a few minutes if medical help is not received immediately. For this reason the Federal Communications Commission has mandated that portable phone providers implement an Enhanced 911 (E911) system by the end of the year 2001.

One way to implement an enhanced 911 system for portable phones is to place a position detector in each phone that communicates the position of the phone to the portable phone service provider. One popular type of position detector is a Global Positioning System (GPS) detector that detects its geographical position based on signals received from several satellites. A press release dated Aug. 10, 1998 at www.sirf.com/as_pr13.htm states that Nokia, one of the leading manufacturers of portable phones, invested in the GPS technology of SiRF Technology, Inc. to allow putting SiRF's GPS detectors into Nokia phones in order to meet the FCC mandate for an E911 system.

While the prior art suggests placing a GPS detector in a portable phone, this teaching is for the purpose of implementing an E911 system, as described above. An E911 system can be implemented by communicating the location of the phone to the cell phone provider without changing the apparent function of the portable phone to the user. The preferred embodiments described herein use the position information from an on-board position detector (e.g., GPS detector) to change the function of the portable phone according to one or more geographical regions defined by the user. In this manner a portable phone may automatically change its function without intervention by a user as the position of the portable phone changes from one defined region to another.

Referring now to FIG. 1, a portable phone 100 in accordance with the preferred embodiments includes a case 105. Within or attached to case 105 are antenna 110, keypad 120, display 130, speaker 140, and microphone 150. Antenna 110 is a standard antenna as is known in the art for allowing portable phone 100 to communicate with its service provider in placing and receiving calls. Keypad 120 includes the traditional 10 numerals, star, and pound key found on most telephone keypads. In addition, keypad 120 includes a "Send" key for placing a call, an "End" key for terminating a call, a "Clear" key for clearing a portion of the display 130, a "Menu" key for displaying a menu on the display 130, up arrow and down arrow keys for scrolling through menus and lists on the display 130, a "Mem" key (short for "memory") that displays information stored in phone 100, and an "ABC" key that changes the ten numeral keys from numeric input to alpha character input. It is well known in the art that the 2 through 0 numeral keys on standard telephones include most of the alphabet characters. For the sake of clarity in the drawing, the alpha characters associated with numeral keys 2 through 0 are not shown. By pressing the "ABC" key, the phone enters and alpha input mode that allows inputting text information into phone 100 via keypad 120 that can be displayed on display 130. The keys on keypad 120 in FIG. 1 are shown by way of example, and many different keys not explicitly shown may be substituted or added within the scope of the preferred embodiments.

Display 130 is preferably a backlit liquid crystal display (LCD) that includes multiple lines of alphanumeric display capability. Speaker 140 is a small, low-power speaker as is known in the art for portable phones. In addition, microphone 150 is a small, low-power microphone as is known in the art for portable phones.

Figure 2:
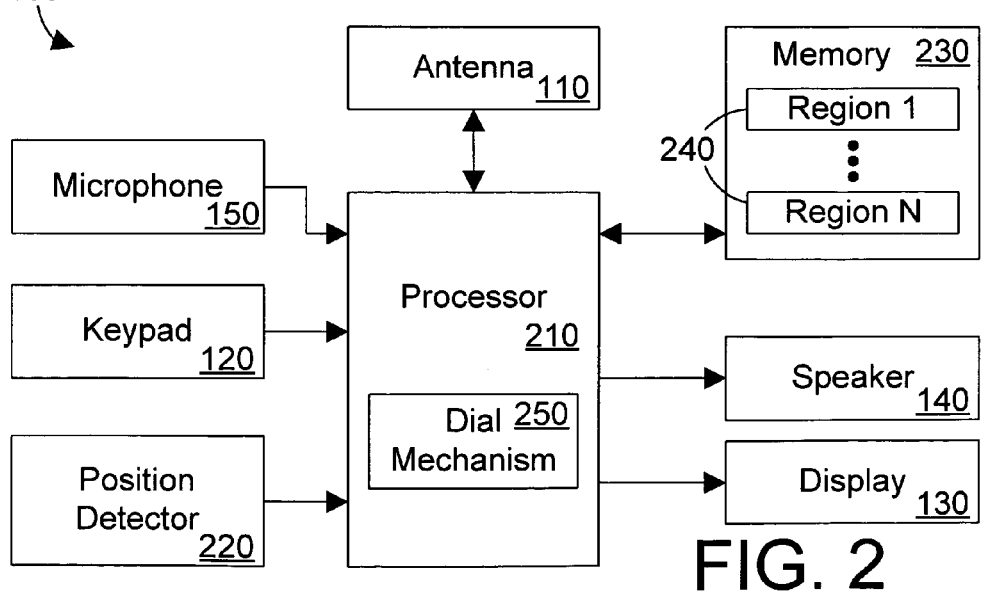
FIG. 2 is a block diagram of components in the portable phone of FIG. 1.

The components of FIG. 1, except for case 105, are shown in the block diagram of FIG. 2. The keypad 120 and microphone 150 are input devices, the display 130 and speaker 140 are output devices, and antenna 110 is both an input and an output device. Portable phone 100 includes a processor 210 that is coupled to the antenna 110, keypad 120, display 130, speaker 140, and microphone 150. In addition, processor 210 is also coupled to a position detector 220 and to a memory 230. Position detector 220 is an electronic device that provides its geographical position to processor 210, preferably in longitude and latitude coordinates. In the preferred embodiments, position detector 220 is a global positioning system (GPS) detector. Memory 230 may include any combination of volatile and non-volatile memory, and preferably includes one or more defined geographical regions 240. Processor 210 includes a dial mechanism 250 that dials telephone numbers that a user enters into display 130 via keypad 120, and that dials telephone numbers corresponding to telephone contacts stored in memory 230. Processor 210 takes input from keypad 120, microphone 150, position detector 220, antenna 110, and memory 230, and generates appropriate output on display 130, speaker 140, antenna 110, and memory 230. Note that the block diagram of FIG. 2 does not include many components or features known in prior art portable phones. FIG. 2 is a simple diagram showing only the most commonly-known components and features that allow a complete description of the preferred embodiments of the present invention. Of course, portable phone 100 could also include any component or feature that is known in the art in addition to those shown within the scope of the preferred embodiments.

Figure 3:
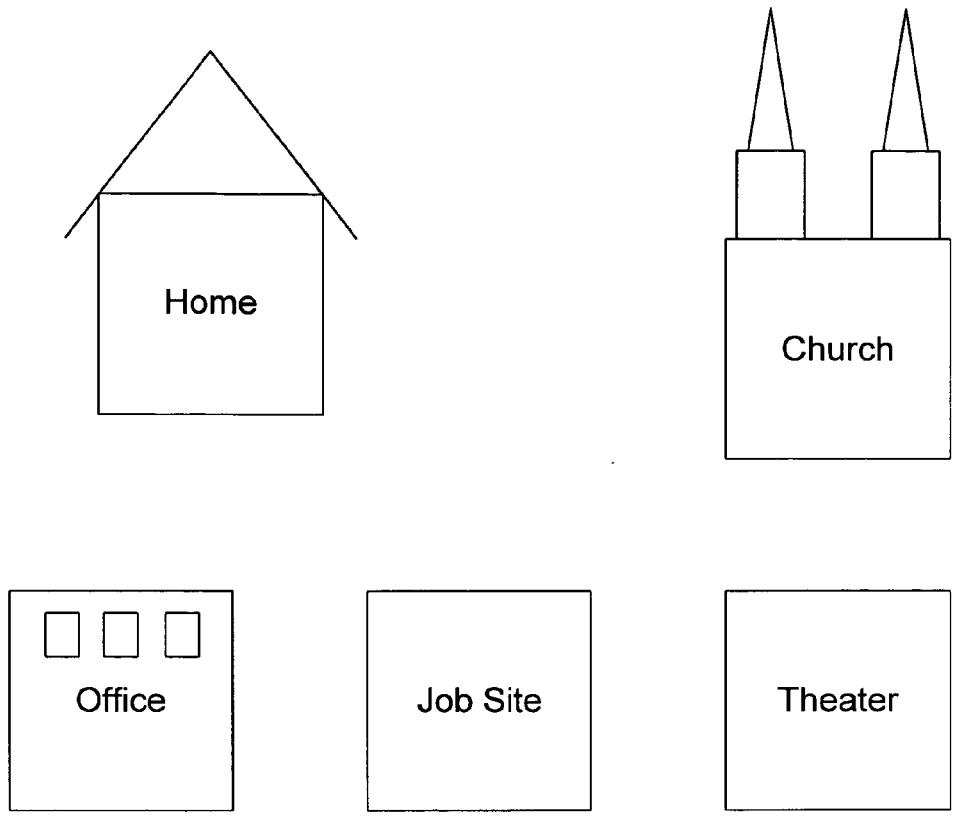
FIG. 3 is a diagram showing different regions that may be defined for the portable phone of FIGS. 1 and 2.

FIG. 3 illustrates different geographical regions that a user may want to define in order to program portable phone 100 to function differently according to whether or not it is in a defined region. For example, we assume that an architect is the user of a portable phone in accordance with the preferred embodiments, and wants to program her phone for the five different regions shown in FIG. 3: home, church, office, job site, and theater. These regions are shown by way of example, and the preferred embodiments expressly extend to the definition of any suitable geographical region.

Figure 4:
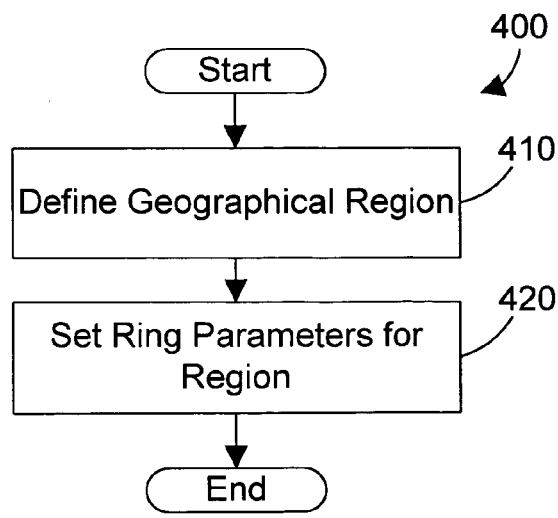
FIG. 4 is a flow diagram showing the steps in setting up ring parameters for defined geographical regions.

Referring to FIG. 4, a method 400 shows the steps in defining regions and setting ring parameters for each region. First, a geographical region is defined (step 410). Next, ring parameters are set for this newly-defined region (step 420). Method 400 is repeated for each region that needs to be defined, thus creating ring parameters for each region that are independent of the ring parameters of other regions. Once the desired geographical regions and the corresponding ring parameters are defined, the portable phone 100 will function differently according to its detected geographical position.

Step 410 in FIG. 4 allows the user to define a geographical region of interest. There are numerous ways for the user to define a geographical region. As stated above, the preferred implementation of position detector 220 in FIG. 2 is a GPS detector. If position detector 220 is a GPS detector, the geographical region must be defined in GPS coordinates. With the proliferation of GPS detectors, it may well be that a user may be able to consult a database to retrieve GPS coordinates for a given location. For example, a mapping company may provide a web site that provides GPS coordinates for any selected region on a map. A user could then enter these coordinates into portable phone 100 using keypad 120 and display 130 to define a region. In the alternative, a company may offer a service that allows a user to call the company using the portable phone 100, which then communicates to the service an identifier for the region of interest (such as an address), and the service could then download GPS coordinates for the region of interest into portable phone 100. Another way for a user to define a geographical region in step 410 of FIG. 4 takes advantage of the on-board position detector 220 within portable phone 200 to allow a user to dynamically define a region of interest. The dynamic creation of a geographical region of interest is explained below with reference to FIG. 5. The preferred embodiments expressly extend to all mechanisms and methods for defining a geographical region, whether currently known or developed in the future.

Figure 5:
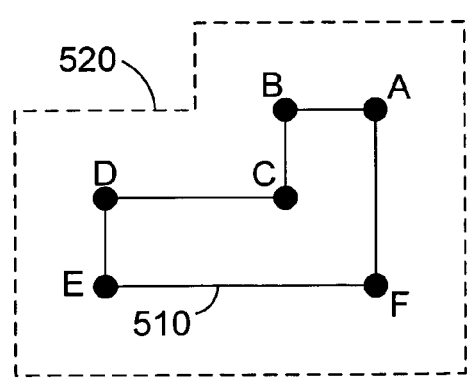
FIG. 5 is a diagram showing how a region may be dynamically defined in accordance with the preferred embodiments.

We assume for the sake of illustration that the architect's office in FIG. 3 is located within an L-shaped office building, the outline of which is shown as 510 in FIG. 5. The architect can dynamically define the geographical region corresponding to her office building by placing the portable phone in a menu-driven "region definition" mode that prompts the user to perform certain actions to define a region. When the "region definition" mode is entered, the display 130 prompts the user to travel to the location of a corner (i.e., boundary point) of the region and press a key (such as the # key). In the example of FIG. 5, we assume that the user puts her portable phone 100 into "region definition" mode, then walks to point A that corresponds to a corner of building 510. The user then presses the # key, which causes processor 210 to read the current geographical position of the portable phone from the position detector 220 and store this coordinate in memory 230. The user then travels to point B, and presses the # key again, causing the processor 210 to get a new position from position detector 220 and store the coordinate in memory 230. The user then travels to points C, D, E and F, pausing each time to press the # key to store the current position as a boundary point of the region. After pressing the # key at point F, the user then presses another key (such as the "End" key) to instruct the processor 210 to compute a region based on the entered corner points. Processor 210 takes each boundary point and effectively "connects the dots" to generate a region of interest. By allowing a user to dynamically define regions of interest using the position detector 220 within the portable phone 100, the user does not need to access any position information in any database when defining regions of interest.

Note that a GPS detector reading is only accurate to within a specified tolerance. For this reason, after constructing the region 510 in FIG. 5, the region may be enlarged by the amount of the tolerance, as shown as 520 in FIG. 5. Expanding the region by the amount of allowable tolerance assures that any reading taken within the building will be detected as lying within the defined region.

Figure 6:
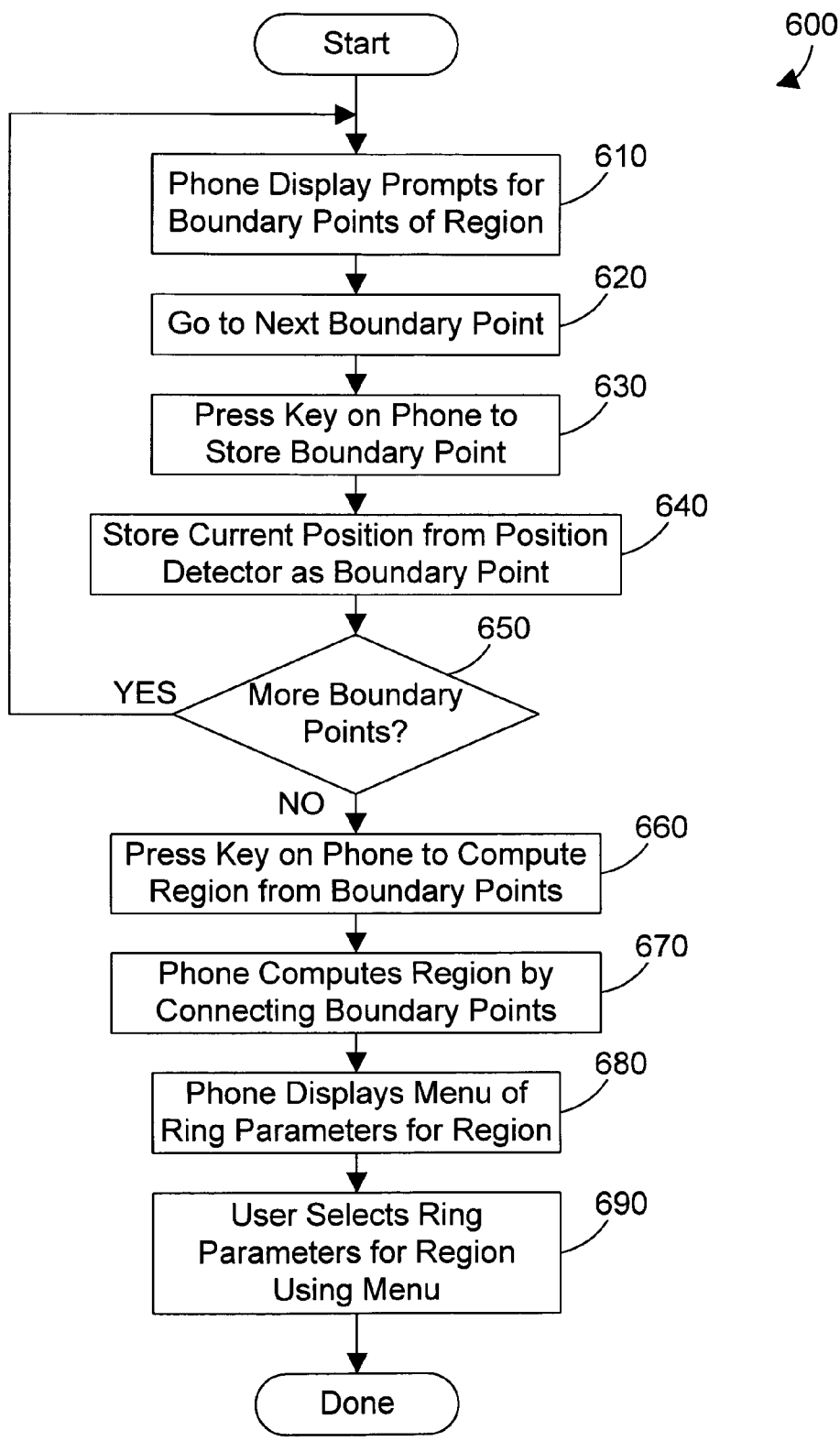
FIG. 6 is a flow diagram that shows one specific implementation of method 400 of FIG. 4 for dynamically defining a region and its corresponding ring parameters.

Referring now to FIG. 6, a method 600 illustrates one specific implementation of method 400 of FIG. 4 that allows a user to dynamically define a region of interest as explained above with reference to FIG. 5. First, the phone display prompts for boundary points of the region (step 610). The user then goes a boundary point (step 620) and presses a key on the phone to store the boundary point (step 630). The phone then stores the current position read from the position detector 220 as a boundary point (step 640). If there are more boundary points to define (step 650=YES), steps 610-640 are repeated until all boundary points have been entered (step 650=NO). At this point a different key is pressed on the phone to compute the region from the stored boundary points (step 660). The phone computes the region by connecting the boundary points (step 670). The phone then displays a menu of ring parameters to the user (step 680). The user selects the ring parameters for the newly-defined region using the menu and keypad 120. Note that for this particular implementation, steps 610-670 correspond to step 410 in FIG. 4, and steps 680-690 corresponds to step 420 in FIG. 4. Method 600 thus allows a user to dynamically define a region, then set the corresponding ring parameters for that region.

Figure 7:
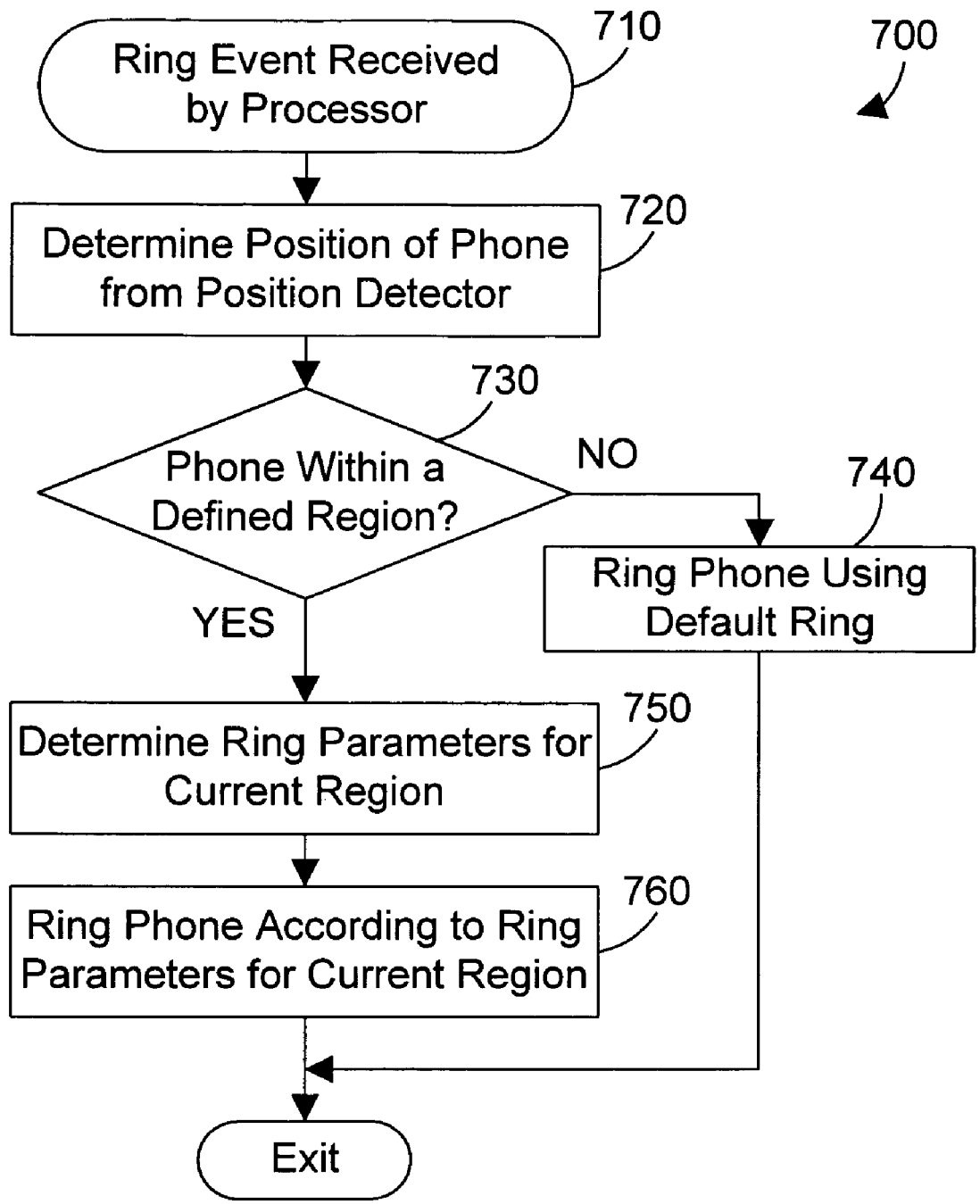
FIG. 7 is a flow diagram of a method in accordance with the preferred embodiments for processing a ring event according to the detected position of the portable phone.

Referring now to FIG. 7, a method 700 shows the steps in processing a ring event in accordance with the preferred embodiments. We assume that a ring event is a particular transmission received by processor 210 via antenna 110 from the service provider for the portable phone. Method 700 begins when a ring event is received by the processor (step 710). First, the position of the phone is determined from the position detector (step 720). Next, the processor determines whether the phone is within any defined region (step 730). If not (step 730=NO), the processor rings the phone using a default ring that was set by the user (step 740). If the phone is within a region 240 stored in the phone's memory (step 730=YES), the processor determines the current ring parameters for the current region (step 750) and rings the phone according to the ring parameters for the current region (step 760). Method 700 illustrates that the portable phone will ring with a default ring when the phone is not in the defined region, and will ring according to stored ring parameters when the phone is in a defined region.

Figures 8, 9:
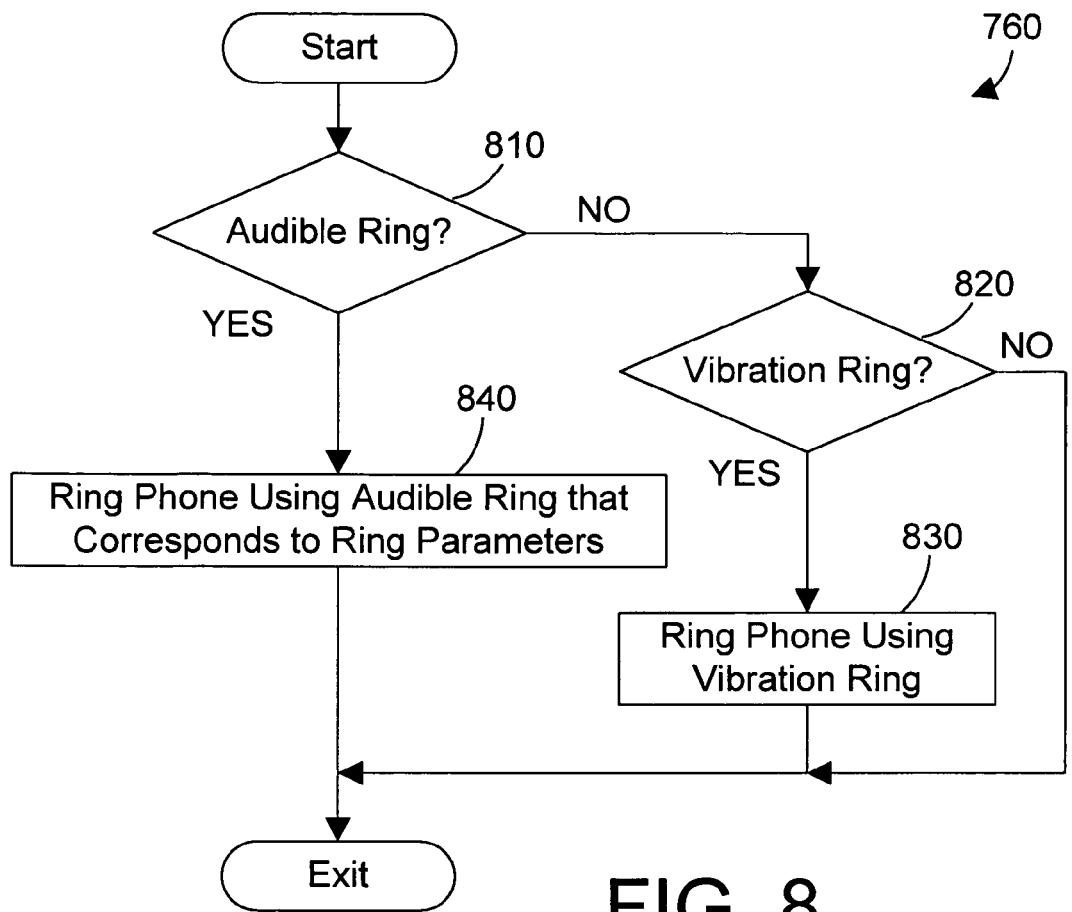
FIG. 8 is a flow diagram of one suitable implementation of step 760 of FIG. 7 in accordance with the preferred embodiments.
FIG. 9 is a table showing sample regions and corresponding ring parameters for illustrating the concepts of the preferred embodiments.

FIG. 8 illustrates one suitable implementation for step 760 of FIG. 7 that rings the portable phone according to the corresponding ring parameters for the region. We assume for this example that the ring parameters may specify two types of rings, an audible ring and a vibration ring. If the ring parameters for the current region specify an audible ring (step 810=YES), the processor rings the phone using an audible ring that corresponds to the ring parameters for the current region (step 840). If the ring parameters for the current region do not specify an audible ring (step 810=NO), and if they do not specify a vibration ring (step 820=NO), the ring is ignored, and the portable phone does not answer the call that was initiated by the ring signal received in step 710 of FIG. 7. If the ring parameters do not specify an audible ring (step 810=NO) but specify a vibration ring (step 820=YES), the phone is ringed using a vibration ring (step 830). Note that the term "vibration ring" is used herein to refer to a ring mode that simply vibrates the phone rather than providing an audible ring so the user can be discretely notified of a call without disrupting others. Pagers that have both audible and vibration modes are well-known in the art. Note that other ways of "ringing" a phone are also possible, such as flashing the light on the phone. The preferred embodiments extend to any way for notifying a user of an incoming call on a portable phone, whether now known or developed in the future.

FIG. 9 shows a table of regions and corresponding ring parameters for the five regions in FIG. 3. We assume that the architect wants her portable phone to ring with an audible ring, with a preset tone (tone A), with a normal ring volume when at home. When at the office, the phone should ring with an audible ring with a different tone (tone B) with a normal ring volume. When at church, the phone should not ring at all. When at the job site where a building is being constructed, the phone should ring with an audible ring with the same tone as the office ring, but with a high volume so the ring will be more likely to be heard over the noise of the construction site. When at the architect's favorite theater, the phone should ring in vibration mode to not disturb the theatrical performance. FIG. 9 illustrates the flexibility provided by the present invention by allowing a user to define geographical regions and to vary the function of a portable phone automatically based on its geographical position.

Having a position detector 220 within a portable phone 100 also allows other features to be incorporated into portable phone 100 that can benefit from the position information provided by position detector 220. One example is to dial different telephone numbers depending on the geographical position of the phone. For example, lets assume that a college student wants to program an entry for "Domino's Pizza" into his portable phone. He can enter the text Domino's Pizza into a text field corresponding to a telephone contact, and then define a first region (that includes his dorm room) that is correlated to a first telephone number for a Domino's Pizza that is closest to his dorm room, and then define a second region (that includes his girlfriend's apartment) that is correlated to a second telephone number for a different Domino's Pizza that is closest to his girlfriend's apartment. Now when he selects the text "Domino's Pizza" from his list of telephone contacts, the portable phone will call different numbers depending on the geographical position of the phone. If the phone is within the first region that includes his dorm room, the phone will dial the first telephone number. If the phone is within the second region that includes his girlfriend's apartment, the phone will dial the second telephone number. Dialing different telephone numbers based on the geographical position of the phone is expressly within the scope of the preferred embodiments.

Figure 10:
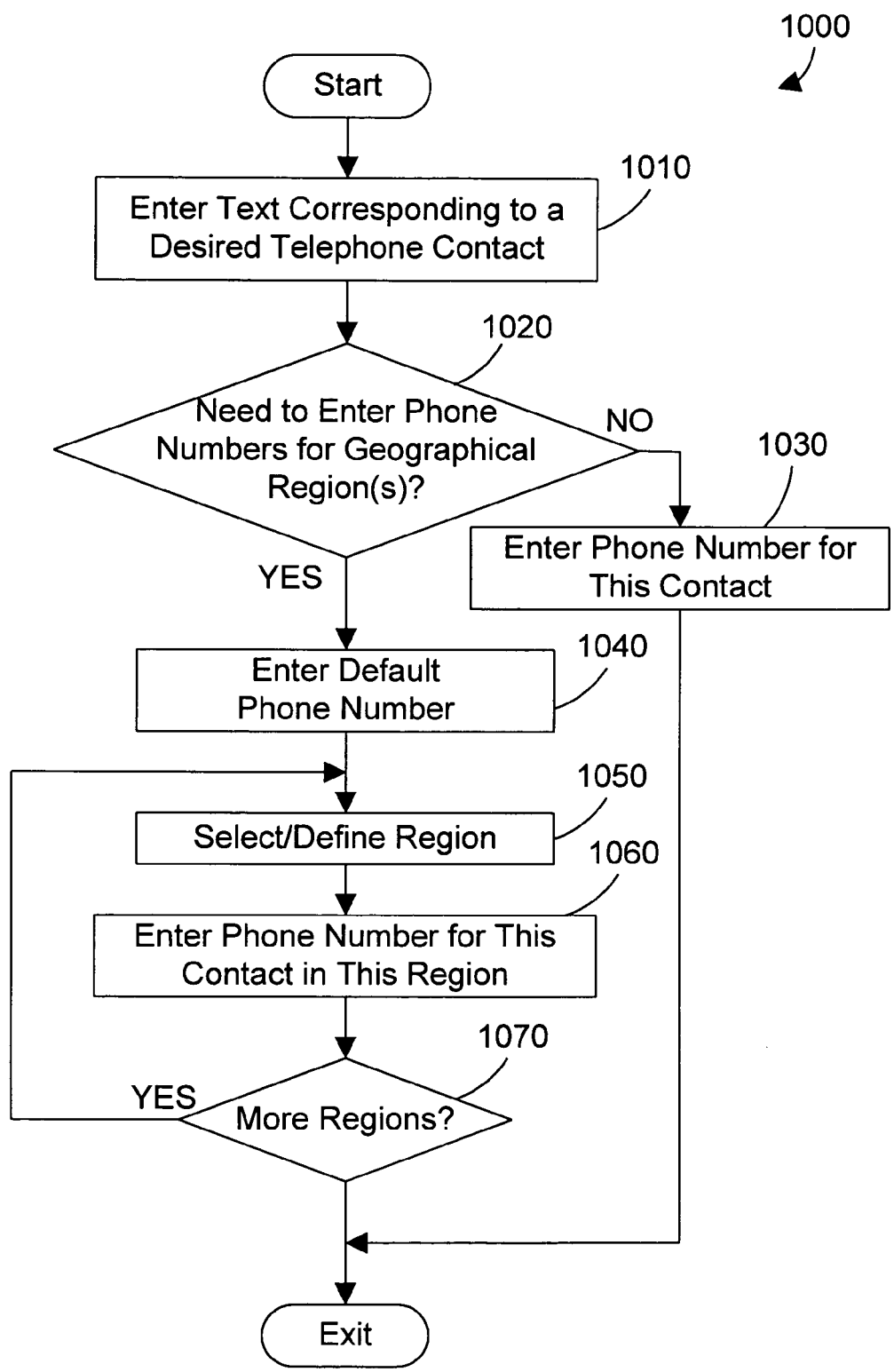
FIG. 10 is a flow diagram showing the steps in defining one or more phone numbers for a telephone contact, where a telephone number may be defined for each defined region for the telephone contact.

Referring to FIG. 10, a method 1000 allows a user to enter a telephone contact into the memory of the phone, and to store multiple phone numbers that each correspond to a geographical region for the telephone contact. First, the text corresponding to the desired telephone contact is entered into the phone (step 1010). This is preferably done using keypad 120 and display 130. In the example above, step 1010 is when the user keys in the text "Domino's Pizza" in his list of telephone contacts. Next, method 1000 determines whether phone numbers for multiple geographical regions need to be entered (step 1020). If multiple regions are not needed (step 1020=NO), the phone number for this contact is entered (step 1030). If, however, phone numbers for multiple regions need to be entered (step 1020=YES), a default phone number is first entered (step 1040) that will be called when the phone is not within any of the defined regions for this telephone contact. Next, either a pre-existing region is selected, or a new region is defined (step 1050). A pre-existing region may be selected from a menu on the display 130, or a new region may be defined using the concepts previously discussed herein. A phone number for the telephone contact in this region is then entered (step 1060). If there are more regions for this telephone contact (step 1070=YES), steps 1050, 1060, and 1070 repeat until there are no more regions to enter for this telephone contact (step 1070=NO). At this point the portable phone has been programmed to dial different phone numbers for the same telephone contact depending on the geographical position of the portable phone.

Figure 11:
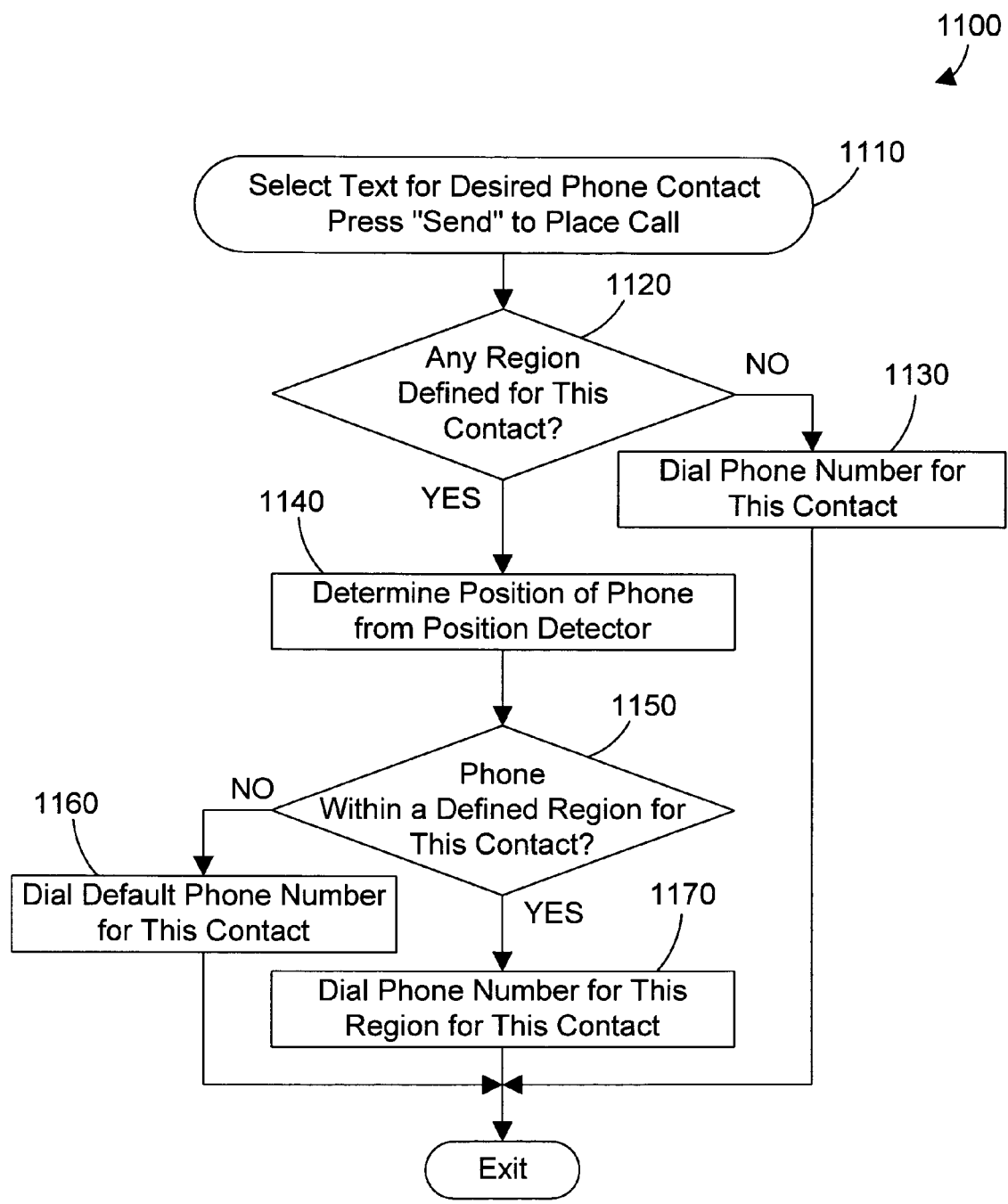
FIG. 11 is a flow diagram of a first method for dialing a telephone contact when its corresponding text is selected.

Referring to FIG. 11, a method 1100 is performed when a user selects a desired contact from the text list of contacts, and presses the "Send" button to initiate a telephone call to that contact (step 1110). If no regions are defined for this contact (step 1120=NO), the single phone number for this contact is dialed (step 1130) by the dial mechanism 250 of FIG. 2. If one or more region is defined for this contact (step 1 120=YES), the phone determines its position from its on-board position detector (step 1140). If the phone is within a defined region for this contact (step 1150=YES), the phone number for this region for this contact is dialed (step 1170). If the phone is not within a defined region for this contact (step 1150=NO), the default phone number for this contact is dialed (step 1160). In this manner method 1100 can dial different telephone numbers for the same telephone contact depending on the geographical position of the portable phone.

Figure 12:
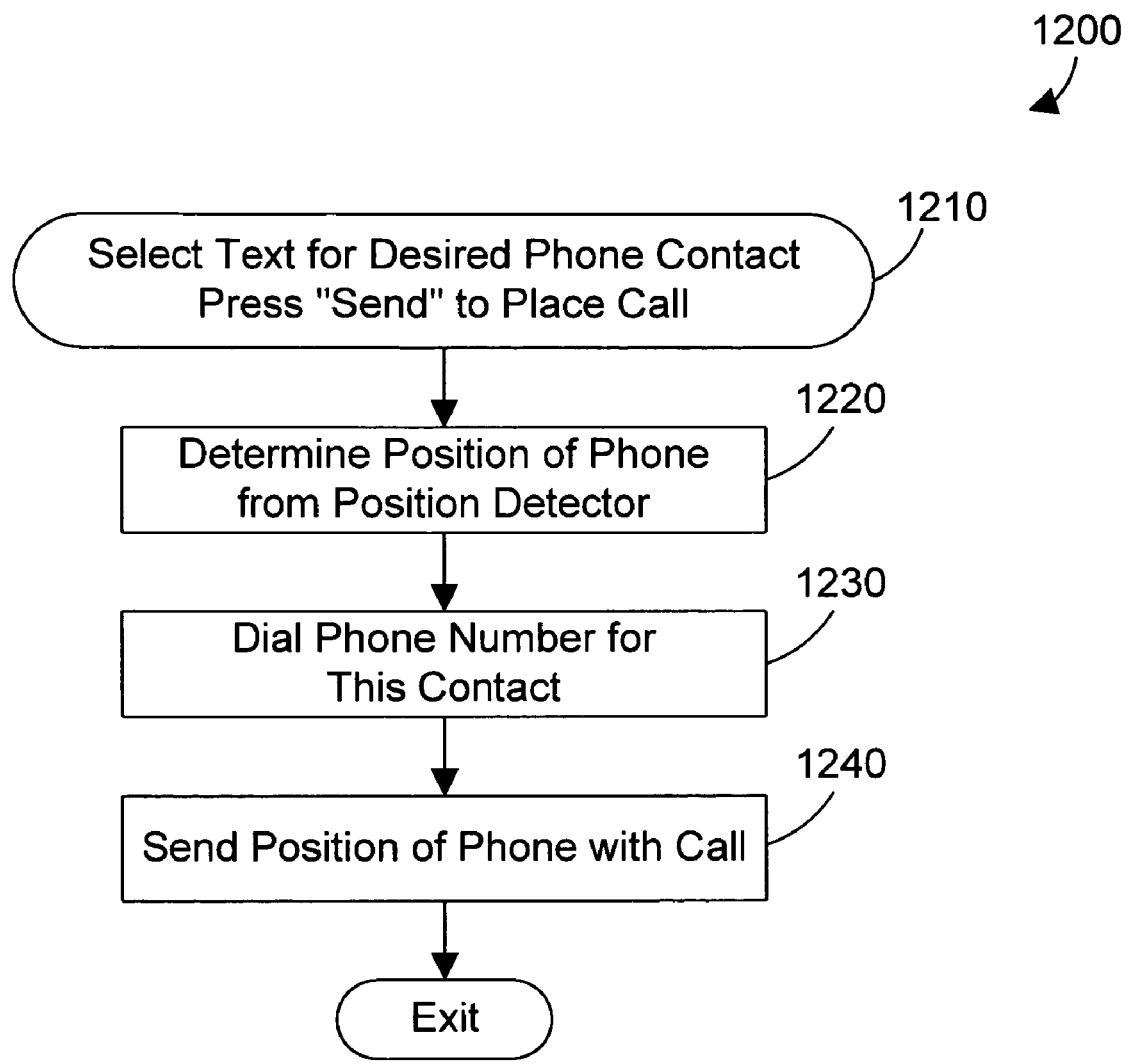
FIG. 12 is a flow diagram of a second method for dialing a telephone contact when its corresponding text is selected.

Having position detector 220 within a portable phone 100 also allows transmitting the location of the phone with a call. Referring to FIG. 12, step 1210 is the same step as step 1110 of FIG. 11, where a telephone contact has been selected from a text list by a user and the "Send" key has been pressed to initiate a call to that contact. Next, the position of the phone is determined from the position detector (step 1220). The phone number for the selected contact is then dialed (step 1230) by the dial mechanism 250, and the position of the portable phone is then sent with the phone call (step 1240). Method 1200 allows a way for the telephone number being called to determine the location of the caller. In the Domino's Pizza example given above, Domino's Pizza may decide to provide one telephone number for many of its restaurants, with the call being routed to the closest restaurant based on the geographical position of the caller that is transmitted with the call in step 1240. Thus, in addition to a "caller ID" that is sent with land-based telephones, method 1200 could also send a "caller location" that identifies where the call is originating. Note that step 1240 in FIG. 12 states "Send Position of Phone with Call", but this step expressly includes any way of sending location information, whether before the call is connected (similar to "caller ID" for land-based phones) or after the call is connected.

Another useful concept is now possible with portable phones that can detect their position. A telephone number can be assigned to a geographical region, and one or more portable phones can then be assigned to that region. When a call goes out to the telephone number corresponding to the region, any phones assigned to that region will ring. If a phone assigned to that region is not in the region when a call comes in, it does not ring. This concept has many possible uses. For example, each entrance of a large industrial building could have a security guard assigned. Each entrance can then have a telephone number assigned to it. If the Security Supervisor wants to check to make sure each entrance is being properly guarded, he or she may call the number corresponding to each entrance. If the guard is at his or her post, the guard's phone will ring so he or she can report to the supervisor. If, for some reason, the guard is not at his or her post, a voice message could inform the supervisor that there is no assigned phone in the region corresponding to that phone number. Assigning a telephone number to a geographical region, and using the position detector in a portable phone to determine whether to ring or not based on whether the portable phone is in the assigned region or not, is a powerful concept. This concept opens up many new possibilities for monitoring the presence or absence of people.

Figure 13:
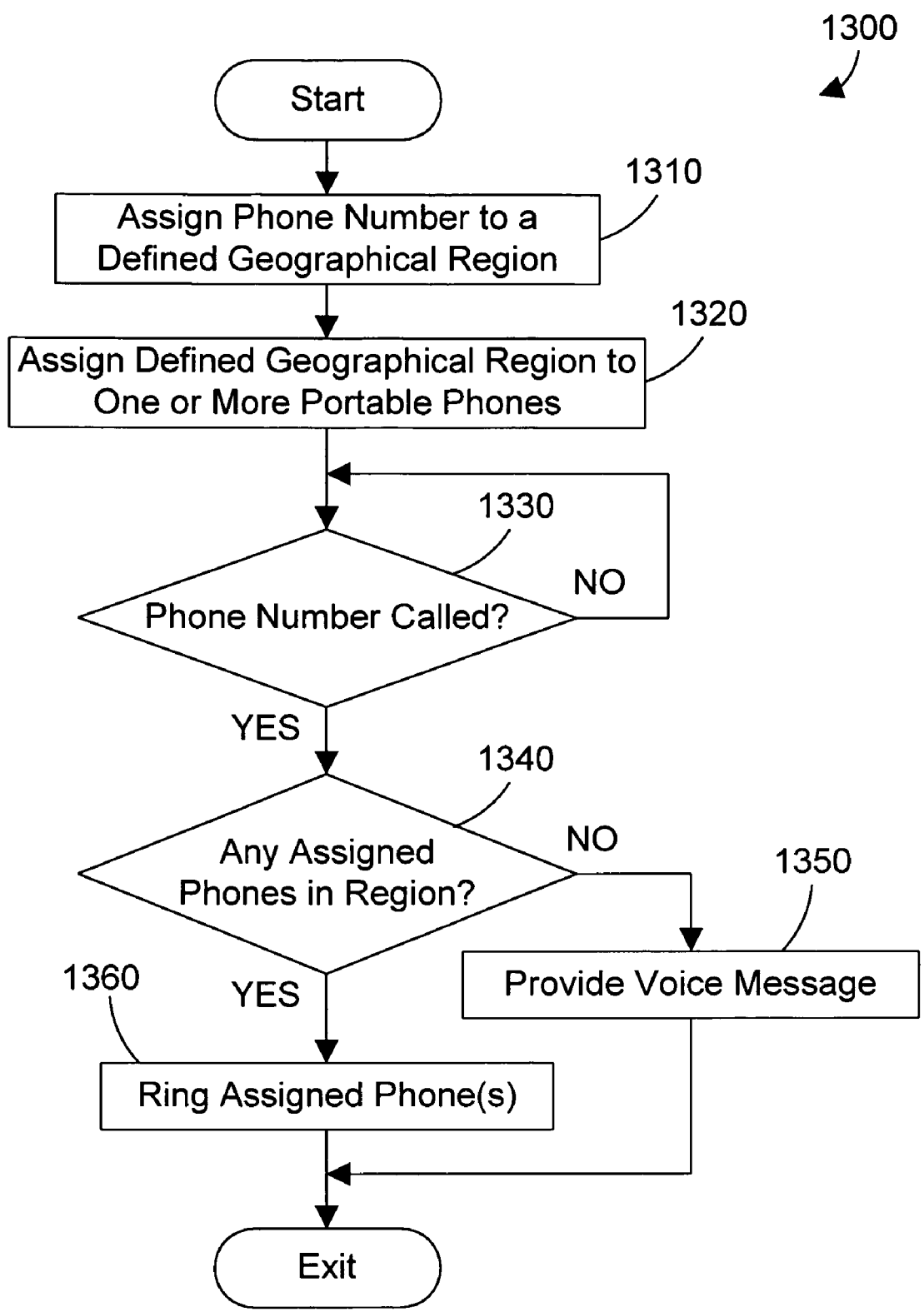
FIG. 13 is a flow diagram of a method for assigning a phone number to a geographical region and assigning one or more phones to the assigned phone number, and for ringing an assigned phone only when the assigned phone is within the defined geographical region.

Referring to FIG. 13, a method 1300 includes the steps for assigning a telephone number to a geographical location, and answering a call based on whether or not there are any assigned phones within that region, as discussed above. First, a phone number is assigned to a defined geographical region (step 1310). Next, one or more portable phones are assigned to the geographical region (step 1320). When the assigned phone number is called (step 1330=YES), method 1300 determines whether there are any assigned phones in the assigned region (step 1340). If so (step 1340=YES), all assigned phones in the assigned region are rung (step 1360), and the first one to answer the call is connected to take the call. If there are no assigned phones in the assigned region (step 1340=NO), a voice message is provided (step 1350) to inform the caller that there are no assigned phones in the region they called. In this manner a caller may be connected to any assigned phone so long as the assigned phone is within the assigned geographical region. If an assigned phone is not within the assigned geographical region, it does not answer the call. Note that the concepts discussed above with respect to setting ring parameters for a region (as illustrated by the examples in FIG. 9) apply equally to a portable phone that is assigned to a geographical region that is, in turn, assigned to a telephone number. When the assigned portable phone is within the region and the assigned telephone number is called, the portable phone preferably rings (or not) according to the ring parameters for the region.

Note that a variation of method 1300 within the scope of the preferred embodiments is to have the voice message of step 1350 provide a voice menu to the caller that allows the caller to press one or more keys on the caller's telephone to connect to an assigned phone that is the closest to the assigned region even though there are no assigned phones in the assigned region. This feature would be very useful in a variety of applications. For the security example discussed above, this feature would allow the Security Supervisor to automatically call a portable phone that is closest to the assigned geographical region in the event that there are no assigned phones in the assigned geographical region.

The present invention provides enhanced functionality for a portable phone by allowing the portable phone to change its function automatically as it travels between defined geographical regions. This changing function frees the user from the worry of turning off their phone when they don't want a call, so long as the region has been defined with ring parameters that include "no ring" or "vibration ring". In addition, the volume and tone of the ring can be adjusted according to the geographical position of the phone. The result is a portable phone that is much more user-friendly, adapting itself to the programmed needs of the user automatically as the phone changes location.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A telephone system comprising:
    a portable phone that includes a position detector that detects geographical position of the portable phone;
    a defined geographical region that is assigned a telephone number;
    a processor in the portable phone that determines from the position detector the geographical position of the portable phone, that receives a call for the assigned telephone number of the defined geographical region, and in response to receiving the call, the processor rings the portable phone if the portable phone is within the defined geographical region, and does not ring the portable phone if the portable phone is outside the defined geographical region; and
    a voice message mechanism that provides a voice message to a caller when there is no assigned portable phone in the defined geographical region, wherein the voice message includes a voice menu that allows the caller to ring a portable phone that is closest to the defined geographical region.

2. The telephone system of claim 1 wherein the position detector comprises a global positioning system (GPS) detector.

3. A method for receiving a call on a portable phone, the method comprising the steps of:
    providing a position detector within the portable phone that detects geographical position of the portable phone;
    detecting the geographical position of the portable phone using the position detector;
    assigning a telephone number to a defined geographical region;
    dialing the telephone number assigned to the defined geographical region;
    the portable phone receiving a call corresponding to the dialed telephone number assigned to the defined geographical region;
    in response to receiving the call corresponding to the dialed telephone number assigned to the defined geographical region, the portable phone causing itself to ring if the detected geographical position of the portable phone is within the defined geographical region and the portable phone causing itself not to ring if the portable phone is outside the defined geographical region; and
    when there is no assigned portable phone in the defined geographical region, providing a voice message to a caller, wherein the voice message includes a voice menu that allows the caller to ring a portable phone that is closest to the defined geographical region.

4. The method of claim 3 wherein the position detector comprises a global positioning system (GPS) detector.

* * * * *